USO05513358A

United States Patent [19]
Lundberg et al.

[11] Patent Number: 5,513,358
[45] Date of Patent: Apr. 30, 1996

[54] METHOD AND APPARATUS FOR POWER-UP STATE INITIALIZATION IN A DATA PROCESSING SYSTEM

[75] Inventors: James R. Lundberg; Charles E. Nuckolls, both of Austin, Tex.

[73] Assignee: Motorola, Inc., Schaumburg, Ill.

[21] Appl. No.: 191,898

[22] Filed: Feb. 4, 1994

[51] Int. Cl.⁶ ..................................................... G06F 13/00
[52] U.S. Cl. ............................................ 395/750; 327/143
[58] Field of Search ........................... 395/750; 364/707; 307/269

[56] References Cited

U.S. PATENT DOCUMENTS

| | | | |
|---|---|---|---|
| 4,736,119 | 4/1988 | Chen et al. | 307/269 |
| 5,237,699 | 8/1993 | Little et al. | 395/750 |

Primary Examiner—Jack B. Harvey
Assistant Examiner—John Travis
Attorney, Agent, or Firm—Charlotte B. Whitaker

[57] ABSTRACT

A method and apparatus for implementing a power-up state initialization. A power sense circuit provides a signal for indicating when the power supply, $V_{DD}$, is of a voltage level greater than the minimum voltage level suitable for safely resolving CMOS logic. The power sense signal, when asserted, enables a small, on-chip ring oscillator. An output signal generated by the ring oscillator supplies a clocking signal to the clock drivers and to the clock state machine of the CPU, thereby providing internal clocks to a central processing unit (CPU). A counter counts the number of clock pulses provided to the CPU and disables the ring oscillator and the clock state machine (thereby stopping the internal data-processor clock drivers) when the accumulated number of clock pulses equals or exceeds a predefined number. The predefined number of internal clock pulses is the minimum number of clocks to process a reset condition that resolves all on-chip, CPU state conflicts and contention.

10 Claims, 3 Drawing Sheets

METHOD AND APPARATUS FOR POWER-UP STATE INITIALIZATION IN A DATA PROCESSING SYSTEM

FIELD OF THE INVENTION

This invention relates generally to data processing systems, and more particularly to data processing systems using power-up initialization for synchronous circuits.

BACKGROUND OF THE INVENTION

When an integrated circuit is powered up, there exists the possibility of state conflicts and/or contention. Such events can cause opposing complimentary devices on the same circuit nodes (i.e., an NMOS pull-down transistor and a PMOS pull-up transistor) to be simultaneously conducting, resulting in a short-circuit current between $V_{DD}$ and $V_{SS}$. Many parallel conflicts can be present causing an excessively large short-circuit current, potentially damaging or stressing the on-die metal power routing and/or the system power supply. In portable applications, where the power supply is a battery, this can be a critical problem that curtails battery life. Furthermore, in some portable applications, power-supply cycling is used to extend battery life (i.e., during lulls in processing, the power supply is turned off to the microprocessor). Thus, the power supply is turned off and on repeatedly, further exacerbating the above problems.

One prior method addressing the above problems is the use of a global asynchronous reset signal. The reset signal is used to initialize all required circuit nodes such that state conflicts and contention are eliminated. This requires at least one extra device at each requisite node and the presence of the reset signal. Given the complexity of a microprocessor, the number of nodes requiring initialization can be very large. Thus, the global reset distribution (metal) can be exceedingly large as can the number of extra devices (transistors) necessary to implement the reset function. This adversely impacts the size, cost, and power consumption of the integrated circuit.

Another method addressing the above problems is to require that the external and internal clocks be running during power-up. This allows reset processing to take place while power ramps up thereby initializing the requisite nodes and eliminating state conflicts and contention. This method is often impractical (or impossible) for the system designer who must ensure a valid clock before the power supply has reached its valid level. Since internal clocks are running throughout the power-supply ramp and until normal processing commences, power ($CV^2F$) is being wasted. This is also counter to the trend towards portable applications where it is important to reduce power and use power management techniques to extend battery life. Should a system design use power cycling as the primary power-management technique, the problem is further exacerbated. Phase-locked loops (PLLs) pose another drawback to this technique. PLL-based internal clocks have an indeterminate frequency and phase (to a reference clock) at power up; therefore, reset processing can not be ensured until after phase lock and phase lock can not be assured until after the power supply is at the specified level. During the phase-lock interval, excess power is still consumed due to contention or state conflicts.

SUMMARY OF THE INVENTION

The invention provides a method and apparatus for implementing a power-up state initialization in a data processing system that minimizes power loss while simultaneously eliminating the need for a global, on-chip, asynchronous reset signal, and eliminating the need and power for external and internal clocks to be running throughout the power supply ramp up. A power sense circuit provides a signal for indicating when the power supply, $V_{DD}$, is of a voltage level greater than the minimum voltage level suitable for safely resolving CMOS logic. The power sense signal, when asserted, enables a small ring oscillator. An output signal generated by the ring oscillator supplies a clocking signal to the clock drivers and to the clock state machine of the data processing system, thereby providing internal clocks to a central processing unit (CPU).

A counter counts the number of clock pulses provided to the CPU and disables the ring oscillator and the clock state machine (thereby stopping the internal data-processor clock drivers) when the accumulated number of clock pulses equals or exceeds a predefined number. The predefined number of internal clock pulses is the minimum number of clocks to process a reset condition that resolves all CPU state conflicts and contention.

DETAILED DESCRIPTION OF A PREFERRED EMBODIMENT

Figure 1:
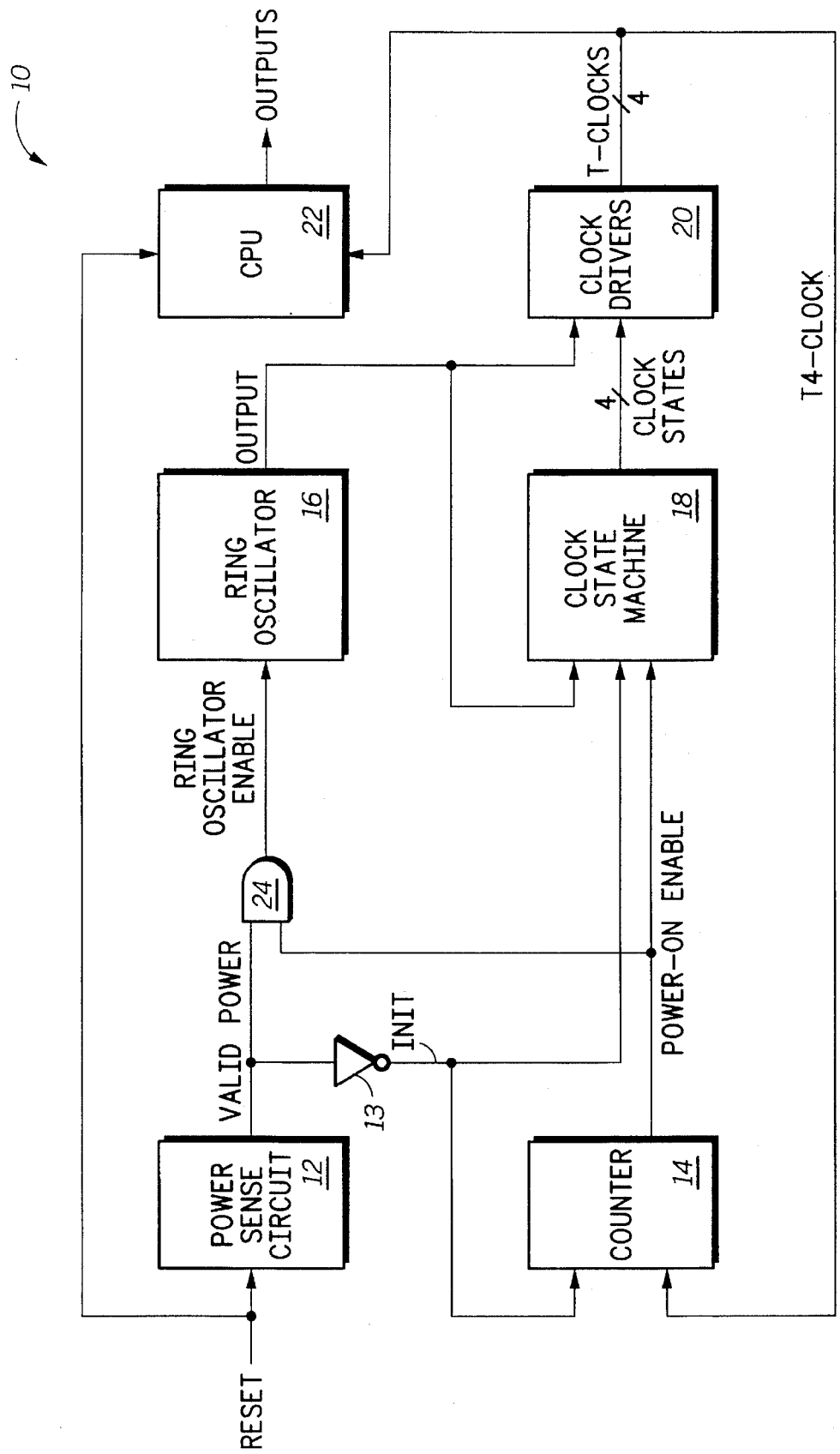
FIG. 1 illustrates in block diagram form a power-up state initialization system, in accordance with a preferred embodiment of the present invention.

FIG. 1 illustrates in block diagram form a power-up state initialization system 10, in accordance with a preferred embodiment of the present invention. In the preferred embodiment, the initialization system 10 includes a power sense circuit 12, a counter 14, a ring oscillator 16, a clock state machine 18, clock driver 20, and enable logic 13 and 24. The initialization system 10 is coupled to a central processing unit (CPU) 22. During normal operation, the power sense circuit 12 determines when the power supply, $V_{DD}$, has reached a level sufficiently high for the safe resolution of CMOS logic. In a preferred embodiment, a $V_{DD}$ level of 1.50 to 2.0 volts was used as the power sense, $V_{DD}$-level threshold. When $V_{DD}$ reaches the power sense, $V_{DD}$-level threshold, the power sense circuit 12 asserts the VALID POWER output signal. The VALID POWER signal, when asserted, signals the down line logic (counter 14, clock state machine 18, ring oscillator 16) that the power supply voltage now equals or exceeds a safe threshold level for CMOS logic resolution.

Figure 2:
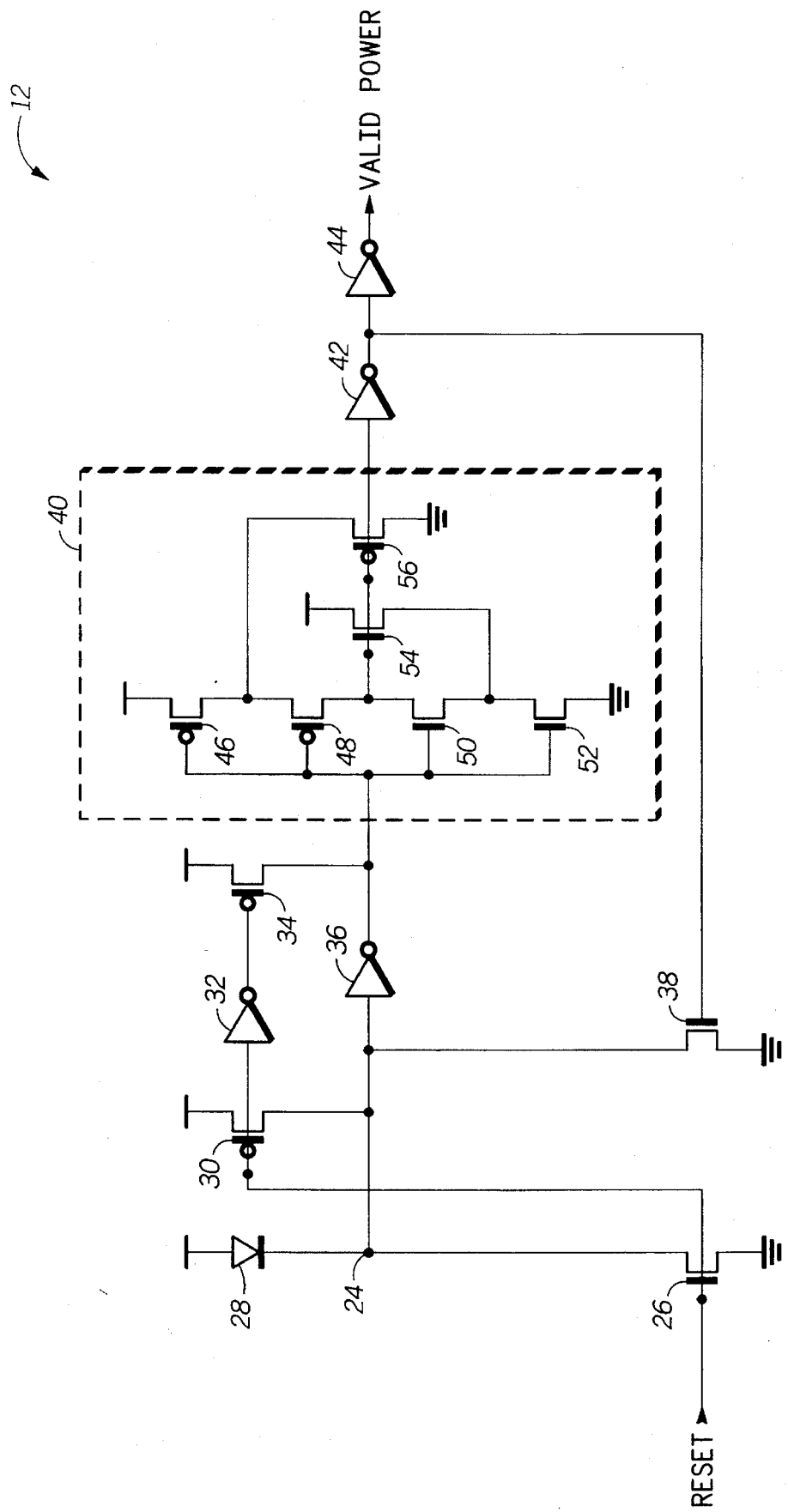
FIG. 2 illustrates in logic diagram form a power sense circuit of the power-up initialization system, in accordance with a preferred embodiment of the present invention.

The operation of the power sense circuit 12 is more fully described with reference to FIG. 2. In the preferred embodiment, at the start of power up, the RESET signal (an external system signal), is required to be asserted, that is, equal to $V_{DD}$ as $V_{DD}$ ramps up. Thus, as $V_{DD}$ exceeds the NMOS threshold (about 0.6 V in the preferred embodiment), transistor 26 is conducting which causes node 24 (comprising the cathode of diode 28, the input of inverter 36, and the drain of NMOS transistor 26) to be a logic low (at $V_{SS}$). To ensure that node 24 is a logic low (at $V_{SS}$) prior to NMOS transistor 26 conducting, a diode, to $V_{SS}$, inherent in the drain diode of NMOS transistor 26 (significantly larger than diode 28 or PMOS transistor 30 drain diode) is used. The large drain diode to $V_{SS}$ of NMOS transistor 26 is used to dominate any diode leakage on node 24. Thus, any diode leakage from $V_{DD}$ through diode 28 (or PMOS transistor 30 drain diode) will be negligible by comparison to the diode leakage to $V_{SS}$. NMOS transistor, 26, silicon diode 28 and CMOS inverter 36 form the core of the power sense circuit. When $V_{DD}$ exceeds $V_t$ (the magnitude of the threshold voltage for PMOS and NMOS transistors where $V_t$ is approximately the same for both) CMOS logic can resolve inputs. Since node 24 is low, when inverter 36 is capable of resolving its input, the output of inverter 36 will be a logic high, tracking $V_{DD}$. Therefore, when $V_{DD}$ is sufficiently high (greater than 0.6 V in the preferred embodiment) for the resolution of CMOS logic, the power sense output signal, VALID POWER, initially is logic low.

Although CMOS logic can resolve inputs at $V_{DD}$ marginally larger than $V_t$, power supply fluctuations and noise make it unsafe to operate at this voltage level. It is, therefore, prudent to wait until $V_{DD}$ is still higher. As $V_{DD}$ ramps further, diode 28 begins to conduct (at about $V_{DD}$=0.7 V). At $V_{DD}$>0.7 V both diode 28 and NMOS transistor 26 are conducting. The sizing of NMOS transistor 26 is such that its conducting impedance is large and the sizing of diode 28 is such that its conducting impedance is small. As $V_{DD}$ continues to ramp, node 24 follows $V_{DD}$ with about a 0.7 to 1 Volt offset from $V_{DD}$. When node 24 is about at 1.75 Volts (+/–0.25 Volts) the output of inverter 36 will change from high to low resulting in the output of the power sense circuit, VALID POWER, being asserted.

Transistors 30, 34, and 38 and inverter 32, are used to optimize the power sense, $V_{DD}$-level threshold and to minimize power in the circuit. A Schmidtt trigger 40 is used to prevent power supply noise from inadvertently triggering the power sense circuit. As illustrated in FIG. 2, the Schmidtt trigger 40 is comprised of P-channel transistors 46, 48 and 56, and N-channel transistors 50, 52 and 54. Inverter 42 and 44 buffer the output of the Schmidtt trigger 40 and give the output of the power sense circuit, VALID POWER signal, a relatively fast rise and fall time. Referring again to FIG. 1, since the output of the power sense circuit, VALID POWER, is at a known initial state (low) when power starts ramping, this signal, inverted by inverter 13 is used to initialize both the counter 14 and clock state machine 18. When VALID POWER is asserted, the initialize (INIT) signal input to counter 14 and clock state machine 18 is de-asserted. This results in the clock state machine 18 (and therefore the corresponding clock drivers 20) being in a predefined initial state at power-up.

In accordance with a preferred embodiment of the present invention, the counter 14 is used to count the number of clock pulses being supplied to the CPU 22. The POWER ON ENABLE output signal provided by the counter 14 is initialized to logic high (i.e., tracks $V_{DD}$) by the INIT signal. The INIT signal also initializes the counter 14 to a known value. Since POWER ON ENABLE is initially high, the input to clock state machine 18 is asserted enabling clock state machine 18. Also since POWER ON ENABLE is a logic high, then the AND-gate 24 is conditioned to pass the assertion of VALID POWER, which results in the assertion of the RING OSCILLATOR ENABLE signal. When the RING OSCILLATOR ENABLE signal is asserted, the ring oscillator 16 begins to supply clocking pulses to both clock state machine 18 and clock drivers 20. In a preferred embodiment of the present invention, the ring oscillator 16 is a simple and small ring oscillator (non-controllable) consisting of an even number of inverters and one enabling NAND-gate (not shown). Thus, the total number of inversions is odd. The only constraint on the ring oscillator 16 is that the number of stages be sufficiently large enough to ensure that the clock pulses supplied at the output of ring oscillator 16 are of large enough period so that the reset condition can be processed by CPU 22. This constraint is easy to achieve.

The clock state machine 18 is used in the preferred embodiment to generate the appropriate clock states for the clock drivers 20. The clock drivers 20 comprise four T-clock drivers each generating one of four phases of quadrature clocks. For each output pulse of ring oscillator 16 one of the four T-clocks is generated. Clock state machine 18 is initialized by the INIT input at power up to a predefined state. The assertion of the POWER-ON ENABLE signal enables clock state machine 18 to change states in a predefined order when a clocking pulse is supplied from ring oscillator 16. If the POWER-ON ENABLE is de-asserted, the clock state machine 18 will not change states.

When the count in counter 14 reaches a predefined number, the counter output, POWER ON ENABLE, is de-asserted. This results in the de-assertion via AND-gate 24 of the RING OSCILLATOR ENABLE signal to the ring oscillator 16 and the de-assertion of the OUTPUT signal to clock state machine 18. The de-assertion of these signals results in both ring oscillator 16 and clock state machine 18 stopping thereby stopping clock drivers 20 and its output, T-CLOCKS, to CPU 22. The predefined number represents the number of clock pulses required to properly process a reset condition by CPU 22 thereby resulting in the resolution of all state conflicts and contention in CPU 22.

In the preferred embodiment clock drivers 20 generate quadrature clocks. Within clock drivers 20 are four individual clock drivers. Each clock driver receives a state signal supplied by clock state machine 18. On every rising edge of the OUTPUT signal, at the input to clock drivers 20, each clock driver drives out the state signal it receives. On any given rising edge of OUTPUT, one driver will change from high to low; one driver will change from low to high; and the remaining two drivers will not change.

Figure 3:
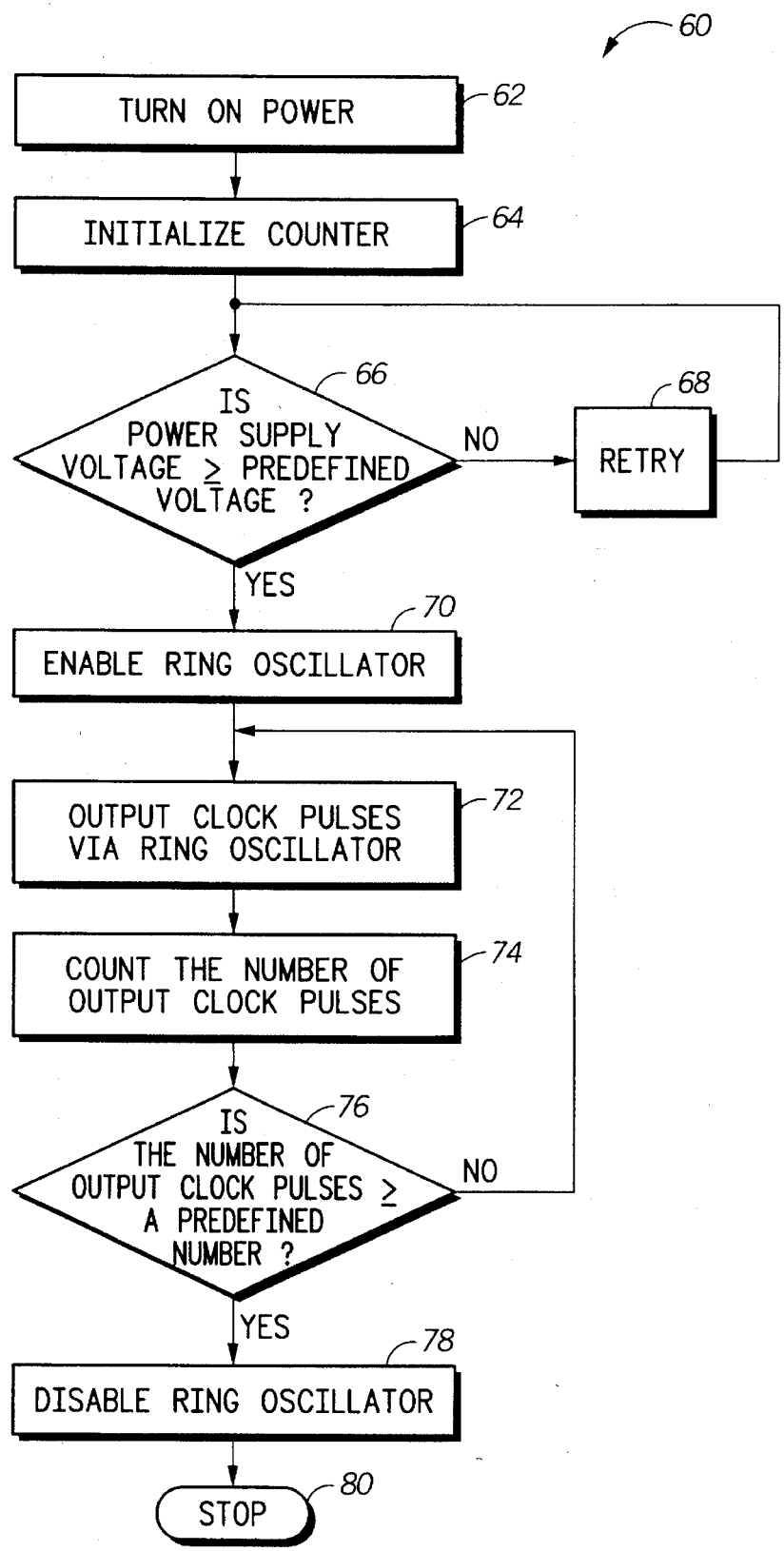
FIG. 3 illustrates a flow diagram for performing power-up state initialization using the power-up state initialization system of FIG. 1, in accordance with the present invention.

Illustrated in FIG. 3 is a flow diagram 60 for performing power-up initialization, in accordance with the present invention. At step 62, system power is turned on by a source external to the initialization system 10, and the voltage level begins ramping to a specified system operating voltage. Accordingly, the power supply does not simply turn on; but instead, it ramps up with a response dictated by the impedance of the power supply with its associated distribution and the capacitance of the system. At step 64 the counter 14 is initialized for counting the number of clock pulses during power up state initialization. The power sense circuit 12 queries whether the power supply is at a predetermined level, at step 66. The predetermined level is a power supply voltage level where CMOS logic can safely resolve inputs. This is a voltage level that exceeds the magnitude of CMOS thresholds and includes enough margin so that power supply noise will not cause false triggering of the power sense circuit 12. A voltage level of 1.75+/–0.25 Volts was used in the preferred embodiment. If the power supply has not reached a suitable level, then at step 68, the power sense circuit 12 will retry the query at step 66, to thereby determine whether the voltage level exceeds the predefined threshold level.

Once the power sense circuit 12 determines that the voltage level equals or exceeds the predefined threshold level, the power sense circuit 12 will assert the VALID POWER signal, thereby enabling the ring oscillator 16, at step 70. The ring oscillator 16 will begin generating output clock pulses, at step 72. At step 74, the counter 14 begins counting the number of accumulated T-4 clock pulses provided by the T4-clock driver (not shown) of clock driver 20. The counter 14 queries whether the number of output T-4 clock pulses exceeds a predefined number, at step 76. If the number of output T-4 clock pulses does not exceed the predefined number, the ring oscillator 16 remains enabled and continues to provide clock pulses, at step 72. If the number of accumulated clock pulses equals the predefined number, the ring oscillator 16 is disabled, at step 78, in response to the counter 14 de-asserting the POWER-ON ENABLE signal. Accordingly, the power-on initialization sequence is terminated, at step 80.

Thus, the present invention provides a method and system for performing power-up state initialization which eliminates the need to have an asynchronous reset signal to initialize all required circuit nodes (such that state conflicts and contention are eliminated in a data processing system). Furthermore, the power-up initialization mechanism of the present invention does not require the presence of an external clock signal. Due to the power savings associated with not having the clocks running throughout power-up, a significant power savings is realizable using the present invention. The present invention is not limited to the preferred embodiment described above. For example, the clock state machine 18 and clock drivers 20 could be eliminated and replaced by a single-phase clocking mechanism. Alternatively, the system 10 could use a phase-locked loop based clock generator or a direct drive clock generator. The ring oscillator 16 could be incorporated as a controllable oscillator (e.g. a voltage-controlled oscillator). Furthermore, the output signal (VALID POWER) of the power sense circuit 12 could be provided by an external source (e.g. a sense amplifier). Accordingly, it is intended by the appended claims to cover all modifications of the invention which fall within the true spirit and scope of the invention.

We claim:

1. In a data processing system having a central processing unit (CPU), a power-up state initialization system comprising:

a power sense circuit for detecting a voltage level at a power supply terminal in said CPU, and for providing a first control signal indicating whether said voltage level is greater than a minimum voltage suitable for CMOS logic resolution;

a counter circuit, coupled to said power sense circuit for receiving said first control signal and a plurality of internal clock pulses, and for counting a number of said internal clock pulses, said counter circuit enabling a second control signal, in response to receiving said first control signal indicating that said voltage level is greater than said minimum voltage suitable for CMOS logic resolution, and disabling said second control signal when said number of internal clock pulses exceeds a predetermined count value; and an initialization logic portion coupled to said power sense circuit and said counter circuit for receiving said first control signal and said second control signal, and for providing said plurality of internal clock pulses in response thereto, said plurality of internal clock pulses being used by said system to propagate a reset condition in said CPU, said initialization logic portion stopping said internal clock pulses in response to receiving said disabled second control signal to reduce power consumption by said system associated with state conflict in said CPU without using externally generated clock signals or a global asynchronous reset signal.

2. The system of claim I wherein said internal clock pulses provided by said initialization logic portion comprise a plurality of multi-phase clock signals.

3. The system of claim 1 wherein said power sense circuit has an input for receiving said reset signal provided by said CPU.

4. The system of claim 1 wherein said initialization logic portion comprises:

a ring oscillator for generating said plurality of internal clock pulses, said ring oscillator being disabled when said when said number of internal clock pulses counted by said counter circuit exceeds a predetermined count value;

clock generation logic for receiving said plurality of internal clock pulses and said second control signal, and for providing said plurality of multi-phase clock signals, in response thereto; and clock driver logic for receiving said plurality of multi-phase clock signal, and for providing said internal clock pulses in response thereto.

5. In a data processing system having a central processing unit (CPU), a power-up state initialization system comprising:

a power sense circuit for detecting a voltage level at a power supply terminal in said CPU, and for providing a first control signal indicating whether said voltage level is greater than a minimum voltage suitable for CMOS logic resolution;

a counter circuit, coupled to said power sense circuit for receiving said first control signal and a plurality of internal clock pulses, and for asserting a second control signal in response thereto, and negating said second control signal when said counter circuit determines that said CPU state initialization is complete;

an initialization logic portion coupled to said power sense circuit and said counter circuit for receiving said first control signal and said second control signal, and for providing said plurality of internal clock pulses in response thereto, said plurality of internal clock pulses being used by said system to propagate a reset condition in said CPU, said initialization logic portion stopping said internal clock pulses in response to receiving negation by said counter circuit of said second control signal, said initialization logic portion being disabled by said counter circuit when said when said number of internal clock pulses counted by said counter circuit exceeds a predetermined count value, to reduce power consumption by said system associated with state conflict in said CPU without using externally generated clock signals or a global asynchronous reset signal;

clock generation logic for receiving said plurality of internal clock pulses and said second control signal, and for providing said plurality of multi-phase clock signals, in response thereto; and clock driver logic for receiving said plurality of multi-phase clock signal, and for providing said internal clock pulses in response thereto.

6. The system of claim 5 wherein said internal clock pulses provided by said initialization logic portion comprise a plurality of multi-phase clock signals.

7. The system of claim 5 wherein said power sense circuit has an input for receiving said reset signal provided by said CPU.

8. In a data processing system having a central processing unit (CPU), a power sensing circuit, clock generation logic, and reset processing logic, a method for implementing a power-up state initialization comprising:

detecting, via a power sensing circuit, a voltage level at a power supply terminal in said CPU, and for providing a first control signal indicating whether said voltage level is greater than a minimum voltage suitable for CMOS logic resolution;

receiving, via reset processing logic, a first control signal and a plurality of internal clock pulses generated via clock generation logic, and enabling a second control signal in response thereto, said plurality of internal clock pulses being used by said system to propagate a reset condition in said CPU;

counting, via reset processing logic, a number of said internal clock pulses and disabling said second control signal when said number of internal clock pulses exceeds a predetermined count value; and stopping said internal clock pulses, via reset processing logic, in response to receiving said disabled second control signal to reduce power consumption by said system associated with state conflict in said CPU without using externally generated clock signals or a global asynchronous reset signal.

9. The method of claim 8 further comprising the step of initializing the reset processing logic to a first count value, prior to commencing said step of counting the number of said internal clock pulses.

10. The method of claim 8 further comprising the step of disabling said reset processing logic, when said when said number of internal clock pulses exceeds a predetermined count value to reduce power consumption, by said system associated with state conflict in said CPU, without using externally generated clock signals or a global asynchronous reset signal.

* * * * *